US007078680B1

(12) United States Patent
Griffin et al.

(10) Patent No.: US 7,078,680 B1
(45) Date of Patent: Jul. 18, 2006

(54) ION MOBILITY SPECTROMETER USING ION BEAM MODULATION AND WAVELET DECOMPOSITION

(75) Inventors: Matthew T. Griffin, Bloomington, IN (US); Jack E. Fulton, Jr., Elnora, IN (US); Robert F. McAtee, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 54 days.

(21) Appl. No.: 10/774,644

(22) Filed: Feb. 6, 2004

(51) Int. Cl.
*B01D 59/44* (2006.01)

(52) U.S. Cl. ........................ 250/287; 250/286; 250/282

(58) Field of Classification Search ................ 250/287, 250/282, 293, 286
See application file for complete search history.

(56) References Cited

U.S. PATENT DOCUMENTS 4,777,363 A 10/1988 Eiceman et al. ............ 250/286
4,950,893 A 8/1990 Reategui et al. ............ 250/282
5,162,652 A * 11/1992 Cohen et al. ............... 250/288
5,200,614 A 4/1993 Jenkins ........................ 250/286
5,340,983 A * 8/1994 Deinzer et al. ............. 250/281
5,455,417 A 10/1995 Sacristan ..................... 250/287
5,587,581 A 12/1996 Stroosnyder ................ 250/287
5,789,745 A 8/1998 Martin et al. ............... 250/286
5,969,349 A 10/1999 Budovich et al. ........... 250/286
6,020,586 A 2/2000 Dresch et al. .............. 250/287
6,144,029 A 11/2000 Adler .......................... 250/288
6,300,626 B1 10/2001 Brock et al. ................ 250/287
6,477,907 B1 11/2002 Chambers et al. ............ 73/866
6,521,887 B1 2/2003 Funsten et al. ............. 250/287
6,580,068 B1 6/2003 Tarver, III et al. .......... 250/286
2003/0001084 A1* 1/2003 Bateman et al. ............ 250/281
2003/0052263 A1* 3/2003 Kaufman et al. ........... 250/281
2003/0085348 A1 5/2003 Megerle ..................... 250/287
2003/0114986 A1* 6/2003 Padmanabhan et al. ........ 702/1
2003/0176804 A1* 9/2003 Melker ....................... 600/532
2004/0018519 A1* 1/2004 Wright, Jr. ...................... 435/6
2005/0051719 A1* 3/2005 Miller et al. ................ 250/287
2005/0061967 A1* 3/2005 Shvartsburg et al ........ 250/288

* cited by examiner

*Primary Examiner*—Nikita Wells
*Assistant Examiner*—Anthony Quash
(74) *Attorney, Agent, or Firm*—Michael P. Stanley

(57) ABSTRACT

The present invention is directed to a system and a method for analyzing and identifying an unknown sample using ion mobility spectrometry. The method pulses an ion gate using a temporally spaced pattern of ion admitting periods and ion repelling periods to achieve an admission duty cycle of about 50% of the total scan time. Ions passing through the drift tube strike an ion detector, generating a time dependent mobility spectrum. A combination of wavelet decomposition and statistical evaluators are used on the mobility spectrum to produce a distinct signature associated with the sample. Signatures are also generated for a number of known agents, and the known agent signatures are used to program a neural network. The sample signature is then compared to the signatures for the known agents using a fuzzy decision maker.

14 Claims, 6 Drawing Sheets

ION MOBILITY SPECTROMETER USING ION BEAM MODULATION AND WAVELET DECOMPOSITION

STATEMENT OF GOVERNMENT INTEREST

The invention described herein may be manufactured and used by or for the Government of the United States of America for governmental purposes without payment of any royalties thereon or therefor.

FIELD OF THE INVENTION

This invention relates to ion mobility spectrometry.

BACKGROUND OF THE INVENTION

Ion mobility spectrometry (IMS) is used in chemical and biological agent detectors and provides good sensitivity, low power requirements, and operation at atmospheric conditions. In general, IMS is a gas-phase ion separation technique that separates different chemical species as a function of both size, i.e. average collisional cross section area, and mass-to-charge ratio (m/z). The mass-to-charge ratio is the molecular weight of a species divided by the number of charges, which in many instances is one because the species is singly charged. In a typical IMS device, a sample to be analyzed is collected and passed through an inlet and into an ion source region where ions are formed. The ions then pass along a drift tube containing a potential gradient that is used to accelerate the ions against a counter-current drift gas, e.g. air. Under the influence of the accelerating voltage, the lighter and smaller ions, i.e. the ions having a smaller mass-to-charge ratio and average collisional cross section area, reach the detector first, and heavier and larger ions arrive later.

As the ions exit the drift tube, they collide with a detector or collector, for example a Faraday Cup. Since the ions exit the drift tube at different times, chemical species in the sample are identified based on known arrival times of certain ions at the detector. When a given ion or group of ions reach the detector, they create a voltage peak that is proportional to the number of ions striking the detector. These peaks are referred to as the IMS spectra, and the IMS spectra are averaged to increase the signal-to-noise ratio (SNR). Therefore, a time window for monitoring the detector is established and monitored for these peaks. In addition, a voltage threshold is established for each peak, and the number of peaks in excess of the voltage threshold is monitored. An alarm condition in the monitoring device is established for a given contaminant in the sample when a sufficient number of peaks above the voltage threshold that are associated with that contaminant are detected.

IMS begins by forming reactant ions through the interaction of reactant molecules with a radioactive source. The sample to be analyzed is ionized by gas phase interaction and subsequent chemical reaction with these reactant ions, creating product ions. The ionization mechanism is proton-transfer and electron-transfer. The reactant and product ions are exposed to an accelerating electric field that is maintained along the entire length of a drift tube. Radioactive sources are not pulsed, producing ions as a continuous stream. Conventional IMS devices use a gating grid upstream of the drift tube to modulate the ion beam in order to break the continuous stream of ions into discrete packets. Then the ion gate is switched to pulse and deflect the ions periodically. This periodic pulsing, however, results in a duty cycle for the IMS device of less than 1%, that is less than 1% of the product ions are utilized in sample analysis.

This short duty cycle and a variety of other operational factors, e.g. matrix interference, affect the sensitivity of the IMS device. For example, a duty cycle of less than 1% decreases the sensitivity of the device. In addition, a significant number of collisions and interactions can occur among the ions, producing clusters and polymers of ions. Ion clusters reduce sensitivity, lower the resolution of the IMS device and cause voltage peaks to appear broadened resulting in lowered resolution.

Conventional IMS devices are also not useful for the characterization of mixtures, because components present in high concentrations or components with high proton affinities will dominate the spectrum. Compounds with lower proton affinities only appeared in the plasmagram when higher concentrations of them are analyzed. Similarly, matrix components present together with the analyte in the sample may cause problems during analysis.

Therefore, an IMS system and method are needed that provide increased sensitivity and utilize significantly more of the sample product ions generated during ionization. In addition, the system and method would be suitable for very low concentrations of chemical compounds and could easily and reliably analyze binary, tertiary and higher order mixtures of chemical compounds.

SUMMARY OF THE INVENTION

The present invention is directed to a system and a method for analyzing and identifying an unknown sample using ion mobility spectrometry (IMS). The method includes pulsing an ion gate located at one end of a drift tube during a pre-determined scan time using a temporally spaced pattern comprising a plurality of ion admitting periods and a plurality of ion repelling periods. Each ion admitting period represents a distinct length of time, corresponding to a distinct admission frequency. The sum of all the distinct lengths provides for an admission duty cycle of about 50% of the total scan time.

After the ions are admitted into and pass through the drift tube, they strike an ion detector. By striking the ion detector, the sample ions generate a time dependent mobility spectrum that is associated with the ionized sample. This mobility spectrum is processed using a combination of wavelet decomposition and statistical evaluators to produce a distinct signature that is also associated with the ionized sample. This signature can then be compared to one or more signatures for known agents to identify the unknown sample.

Signatures for the known agents are generated by the same steps used to create the distinct signature for the unknown sample. In order to facilitate the identification of the unknown sample, the signatures for the known agents are used to train a neural network, and a fuzzy decision maker is used in combination with this neural network to analyze the sample signature against the plurality of known agent signatures to determine which known agent signature matches the distinct sample signature. In one embodiment, the fuzzy decision maker identifies two or more known agent signatures matching the distinct sample signature as would occur in samples that contain mixtures of chemical compounds.

The IMS system in accordance with the present invention includes a drift tube containing an accelerating voltage potential and a counter-current drift gas and an ion gate disposed at a first end of the drift tube. An ion gate controller is provided in communication with the ion gate and is arranged to pulse the ion gate during a pre- determined scan time using a temporally spaced pattern of pulses. This spaced pattern includes a plurality of ion admitting periods and a plurality of ion repelling periods. Each ion admitting period represents a distinct length of time, and the sum of all the distinct lengths of time equals about 50% of the total scan time.

An ion detector is disposed at a second end of the drift tube and is capable of generating a time dependent mobility spectrum based upon the voltage induced by a plurality of sample ions striking the ion detector. The IMS system also includes a logic control unit or processor in communication with the detector to receive data such as the mobility spectrum. The logic control unit contains programs or algorithms that allow it to process the mobility spectrum using a combination of wavelet decomposition and statistical evaluators to produce a distinct signature associated with the sample. The algorithms also provide a neural network that can be trained using a plurality of known agent signatures and permit the logic processor to act as a fuzzy decision maker to compare an unknown sample signature to known agent signatures.

DETAILED DESCRIPTION

Figure 1:
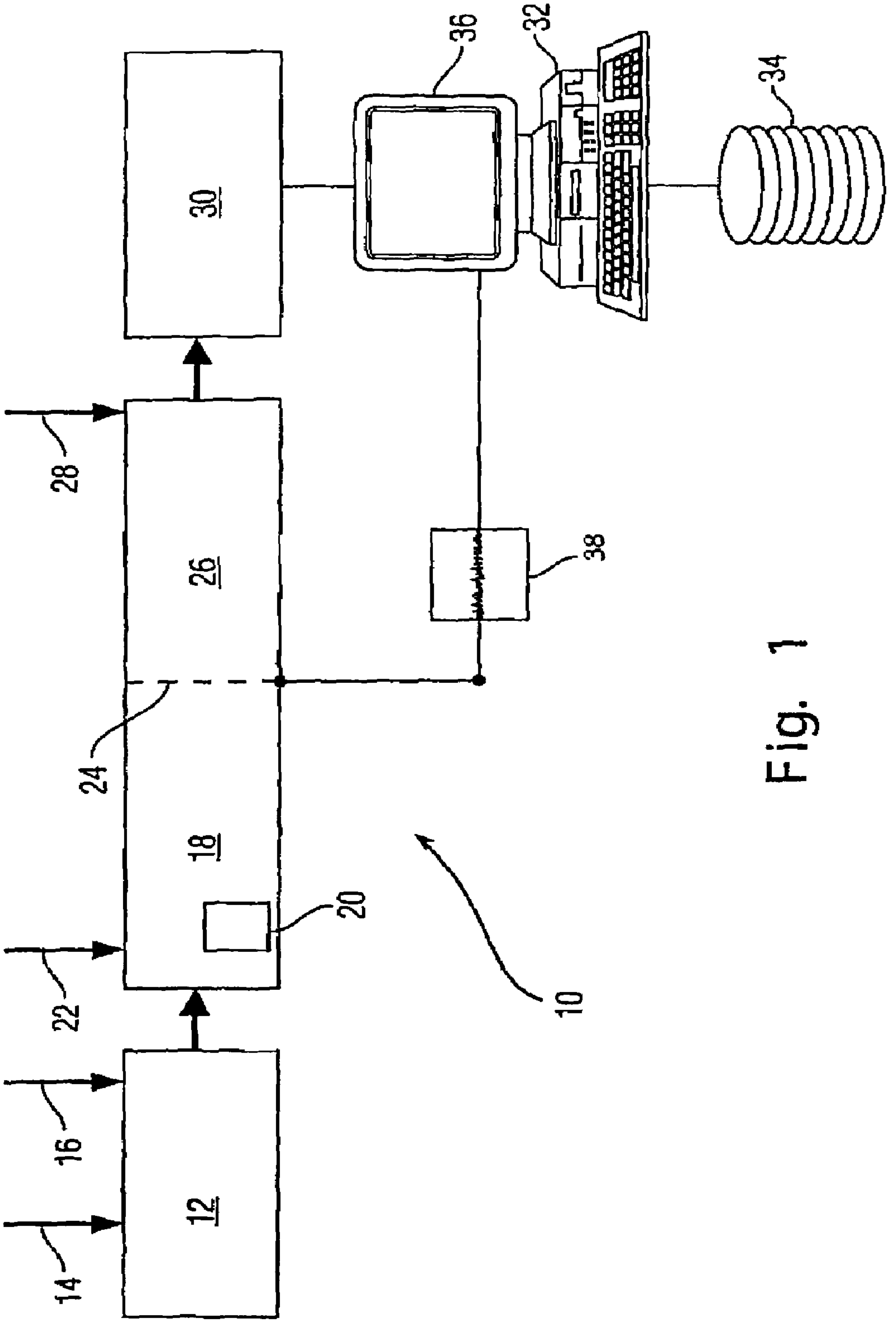
FIG. 1 is a schematic representation of an embodiment of the ion mobility spectrometry system in accordance with the present invention.

Referring initially to FIG. 1, an ion mobility spectrometry (IMS) system 10 in accordance with the present invention is illustrated. The IMS system 10 can be an automated or manual system and can be stationary or portable. The IMS system 10 operates at atmospheric pressure. As illustrated, the IMS system 10 includes an inlet region or assembly 12 having at least one sample inlet 14 arranged to accept one or more samples to be analyzed. Suitable inlet region 12 arrangements are known and available in the art. The samples can be introduced into the inlet in a gaseous state or can be introduced in a liquid state and vaporized. The inlet assembly 12 can also include one or more reactant inlets 16 to provide for the introduction of reactant into the IMS system 10. Suitable reactants include acetone, ammonia and water, although others exist. In one embodiment, the reactants are introduced as a continuous liquid flow that is vaporized in the inlet region 12 and mixed with the gaseous or vaporized sample.

The IMS system 10 also includes an ionization region 18 in communication with the inlet region 12 and arranged to accept the gaseous mixture of sample and reactant and to ionize the gaseous sample to create sample or product ions for analysis. Suitable arrangements for the ionization region 18 are available and known in the art. The sample can pass directly into the ionization region 18 or can pass through a suitable filter or membrane (not shown) arranged to prevent particles, liquid or moisture from passing into the ionization region 18. The ionization region 18 includes an ionization source 20, for example a photoionization source, an electrospray ionization source, a corona discharge source, an alkali-bead emissive source or a radioactive source. In one embodiment, the ionization source 20 is a radioactive nickel ($^{63}Ni$) source. The ionization region 18 can also include a sweep gas inlet 22 to provide a sweep gas flow to urge the sample ions through the ionization region 18. Suitable sweep gases include air and inert gases such as helium and nitrogen.

The IMS system further includes an ion gate, shutter gate, or gating grid 24. In one embodiment, the ion gate 24 is disposed at a first end of a drift tube 24. Alternatively, the ion gate 24 can be arranged as a divider that separates an ionization region from a drift region in a single drift tube structure. Suitable ion gates include Bradbury-Nielson ion gates. In general, the ion gate is arranged as a plurality of parallel and perpendicular wires or as a wire mesh to which a voltage is applied. By applying voltage to the ion gate 24, the ion gate 24 is capable of selectively and alternatively being opened to admit sample ions into the drift tube 26 and being closed to repel sample ions from the drift tube 26. When the ion gate 24 is open, the ions of the correct polarity can enter the drift region.

The drift tube 26 is typically an elongated or cylindrical assembly that includes an arrangement of conductive electrodes and insulators. Each electrode is charged to an appropriate electric potential to establish a uniform electric field extending through the drift tube 26. The drift tube also includes a countercurrent drift gas inlet 28 to provide for introduction of a drift gas into the drift tube 26 flowing opposite to the direction that the sample ions travel under the force of the electric field. Suitable drift gases include air and inert gases such as helium and nitrogen.

The sample ions, upon entering the drift tube 26 are separated as they are accelerated through the drift tube by the electric field against the counter current neutral drift gas. The time it takes for the sample ions to travel the length of the drift tube 26 is variable and depends upon mass, geometry, size and charge, producing a distinct transit time through the drift tube 26 that is characteristic of the sample being tested.

Figure 2:
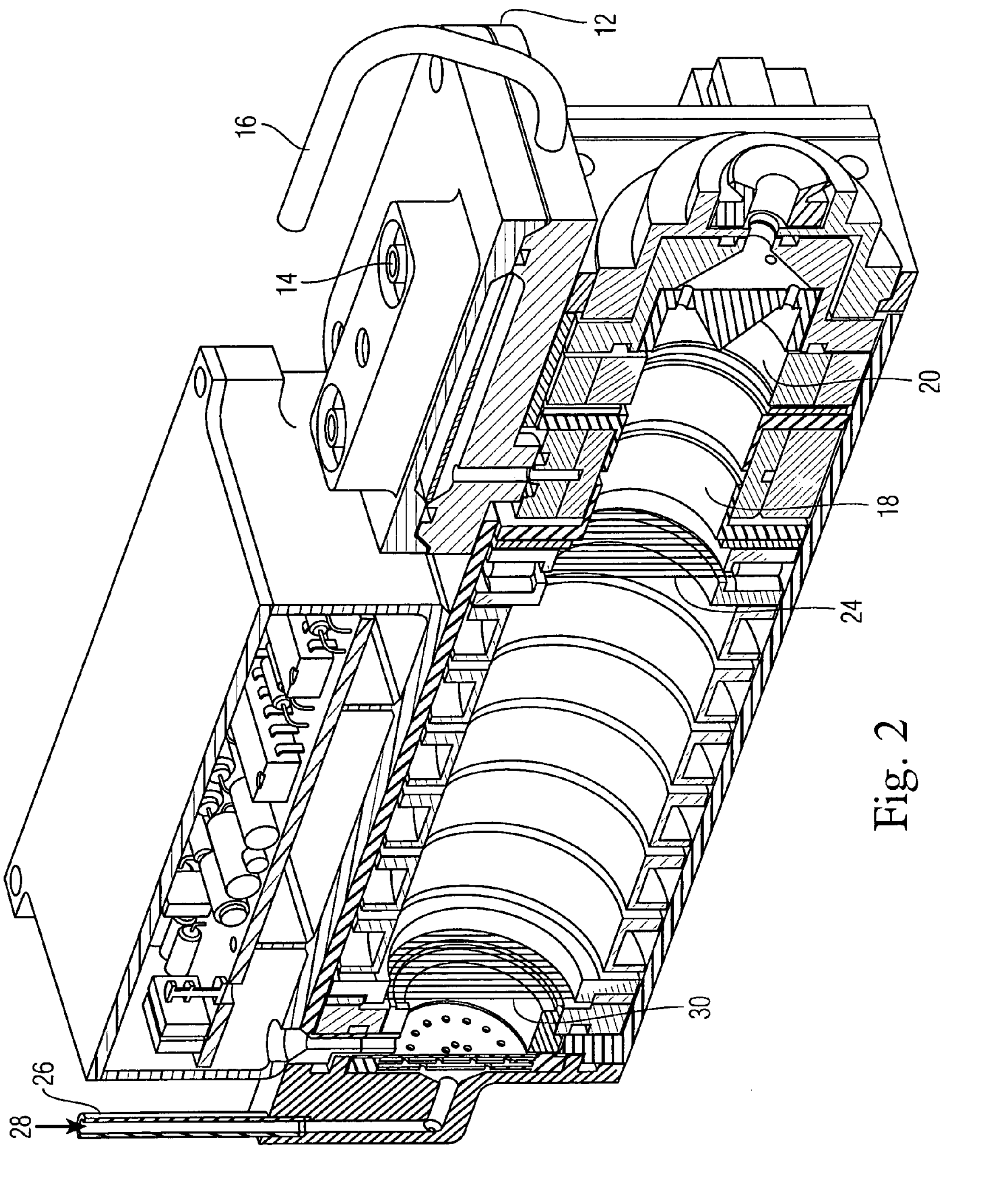
FIG. 2 is a cut-away perspective view of an ion mobility spectrometry system for use with the present invention.

The IMS system 10 also includes an ion detector 30 disposed adjacent a second end of the drift tube 26 opposite the first end. The ion detector 30 is arranged such that the sample ions exiting the drift tube 26 collide with the ion detector, generating a current that is proportional to the number of sample ions colliding with the detector at any given time. Since the sample ions exit the drift tube over a given time period, the ion detector 30 is capable of generating a time dependent voltage output, called a mobility spectrum. The mobility spectrum is based upon the voltage induced by the plurality of sample ions passing into the drift tube during the admitting periods and striking the ion detector. Suitable embodiments of these components are known and available in the art. One embodiment is illustrated in FIG. 2.

In order to control the detector 30 and ion gate 24 and for the collection, analysis and display of the mobility spectrum information generated by the detector 30, the IMS system 10 includes one or more logic control units or processors 32 that are arranged to act as controllers, data handlers and decision makers. Suitable logic control units 32 include personal computers, including desktop and laptop computers, mainframe computers, personal digital assistants, programmable logic controllers and electrically erasable programmable read-only memory. The logic control unit 32 is in communication with the ion detector 30 and capable of receiving data therefrom. The logic control unit 32 can be in direct contact with the ion detector 30 or can be in contact with the ion detector 30 across a wired or wireless network including local area networks, wide area networks, private area networks and secure area networks. In order to provide for the storage of data collected and generated, the logic control unit 32 is in communication with one or more databases 34. In addition to being logged in the database 34, data can be outputted on a display device 36.

The logic control unit 32 is also in communication with the ion gate 24 to provide control for the opening and closing of the ion gate 24. In one embodiment, the logic control unit 32 is in direct communication with the ion gate 24 and controls the ion gate 24 directly. In another embodiment as illustrated in FIG. 1, the logic control unit 32 is in communication with an ion gate controller 38 that is in direct communication with the ion gate 24. In one embodiment, the ion gate controller 38 includes a transistor-transistor logic (TTL) level clock source. Although illustrated in direct communication, the logic control unit 32 and ion gate controller 38 can be arranged to operate independently from each other.

Whether the logic control unit 32, ion gate controller 38 or both are used, these systems are arranged to pulse the ion gate during pre-determined scan times using a temporally spaced pattern comprising a plurality of ion admitting periods and a plurality of ion repelling periods. All of the admitting and repelling periods can be of a uniform length, or each ion admitting period can represent a distinct length of time. The length of time associated with an admitting period corresponds to a certain admission frequency.

In addition to logging the data from the ion detector 30 and controlling the ion gate 24, the logic control unit 32 is capable of processing the mobility spectrum using a combination of wavelet decomposition and statistical evaluators to produce a distinct signature associated with each sample. These distinct signatures can be stored in the database 34. In addition, a list of known agent signatures generated independently from the IMS system can be stored in the database 34, and the logic control unit 32 can be used to compare the signature of a known agent against the signature generated by an unknown sample to find a match. As used herein, the term agent includes, but is not limited to, chemicals, gases, chemicals that are considered hazardous to humans or the environment, explosives, drugs, chemical warfare agents, nerve and blister agents, microbiological constituents, biological warfare agents and petrochemicals.

In one embodiment, the logic control unit 32 operates as both a neural network and a fuzzy decision maker. The neural network can be trained using the plurality of known agent signatures, and the fuzzy decision maker is used to compare the known signatures to the distinct signature created for the unknown sample. The fuzzy decision maker can account for variances and atmospheric conditions, and the combination of the trained neural network and fuzzy decision maker facilitates the analysis of samples that contain single constituents as well as binary, tertiary and higher mixtures of chemical compounds. The logic control unit 32 includes programs, algorithms or software capable of performing the necessary computational functions and of performing the neural network and decision maker functions. Suitable software includes MATLAB®, commercially available from The MathWorks, Inc. of Natick, MA.

The present invention is also directed to a method for analyzing an unknown sample using an IMS system in accordance with the present invention. In one embodiment, the method includes creating a sample in a gaseous state by either introducing the sample in a gaseous state into the inlet region 12 or introducing the sample in a liquid state and vaporizing the sample. A reactant is also introduced into the inlet region 12, in either a liquid or gaseous state, and is allowed to mix with the gaseous sample. The sample and reactant mixture is then sent to the ionization region 18 and exposed to the ionization source 20 to create a plurality of sample ions.

Typically, sample ions are formed in the ionization region 18 by collisions between reactant ions and sample molecules. This occurs in the gas phase by electron- or proton-transfer from reactant ions available in the ionization chamber to sample molecules, i.e. atmospheric pressure chemical ionization (APCI). The sample ions can either be positively charged or negatively charged.

Figure 3:
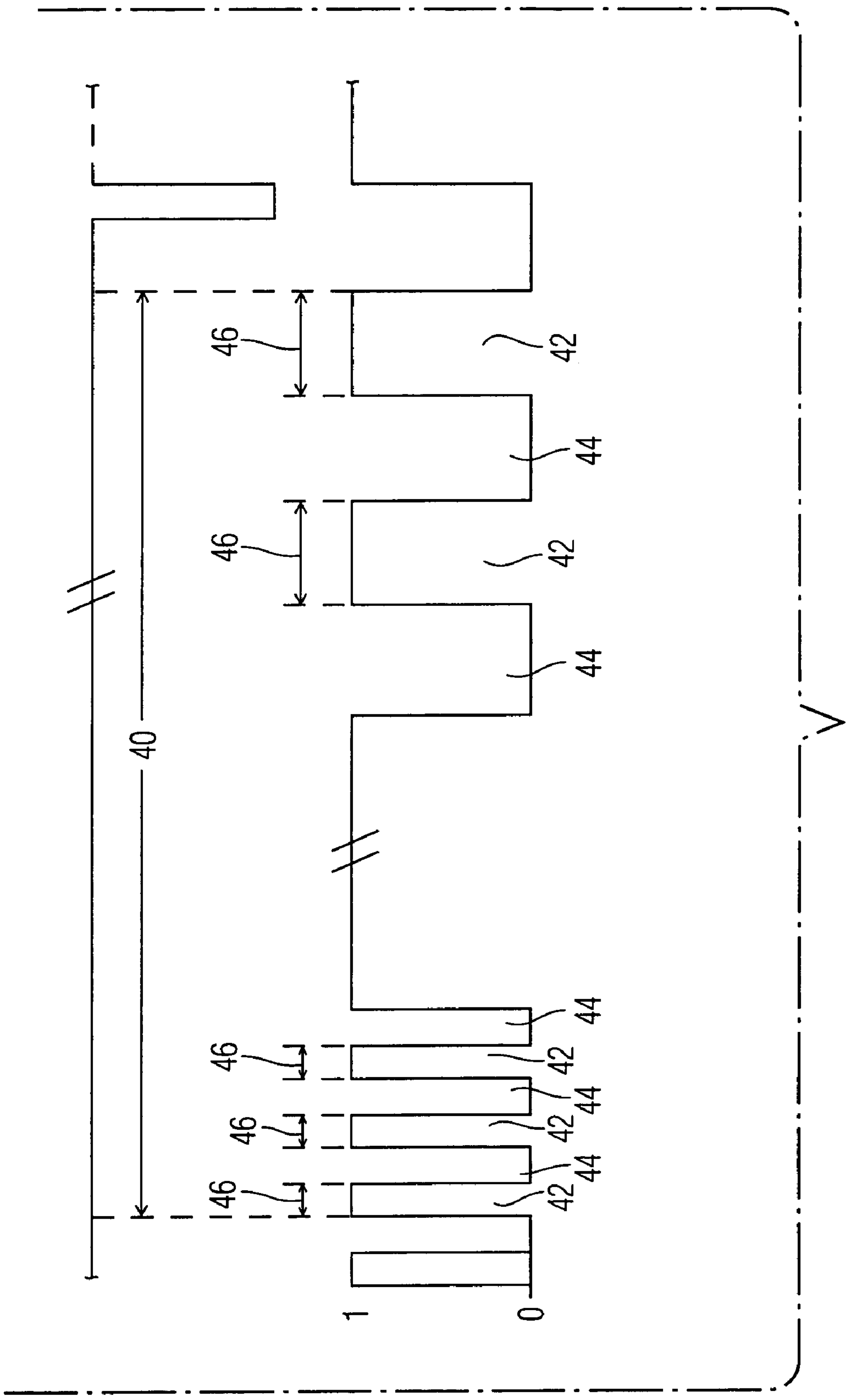
FIG. 3 is a graphical representation of an embodiment of an ion gate triggering pattern for use in the present invention.

The sample ions are then exposed to the ion gate 24. In one embodiment, an inert sweep gas is used to urge the sample ions toward the ion gate 24 located at the first end of the drift tube 26. As illustrated in FIG. 3, the ion gate 24 is pulsed over the course of a pre-determined scan time 40 using a temporally spaced pattern of a plurality of alternating ion admitting periods 42 and ion repelling periods 44. The ion admitting periods 42 correspond to the application of a voltage to the ion gate to establish a polarity that allows the sample ions to pass. Conversely, the ion repelling periods 44 correspond to a voltage applied to the ion gate 24 to establish a polarity to prohibit the sample ions from passing. As illustrated, FIG. 3 shows the logic state provided by the controller, either the ion gate controller 38 or logic control unit 32, used to control the ion gate 24. The logic low states (0) correspond to the ion admitting periods 44, and the logic high states (1) correspond to the ion repelling periods 42.

Therefore, the controlling pattern is a plurality of square waves, each square wave representing the energizing of the ion gate for a pre-determined period of time. Each ion admitting period 42 represents a pulse duration or length of time 46. Although the lengths of time 46 can all be equal, preferably each length of time 46 is distinct or different and represents the energizing of the ion gate 24 at a unique admission frequency, and the lengths of time 46 increase as this unique admission frequency decreases and vice versa. Therefore, the lengths of time 46 are selected based on the associated frequencies to result in an overall duty cycle swept over a range of frequencies.

Once the sample ions are admitted into the drift tube 26 by the ion gate 24, they are exposed to both a potential gradient sufficient to accelerate sample ions along a drift tube and a counter current drift gas, for example air. Exposure to the accelerating voltage and counter current drift gas affects the time it takes for the sample ions to travel the length of the drift tube 26 depending upon the mass, geometry, size and charge of the sample ions. The actual transit time through the drift tube 26 is characteristic of the sample tested.

Figure 4:
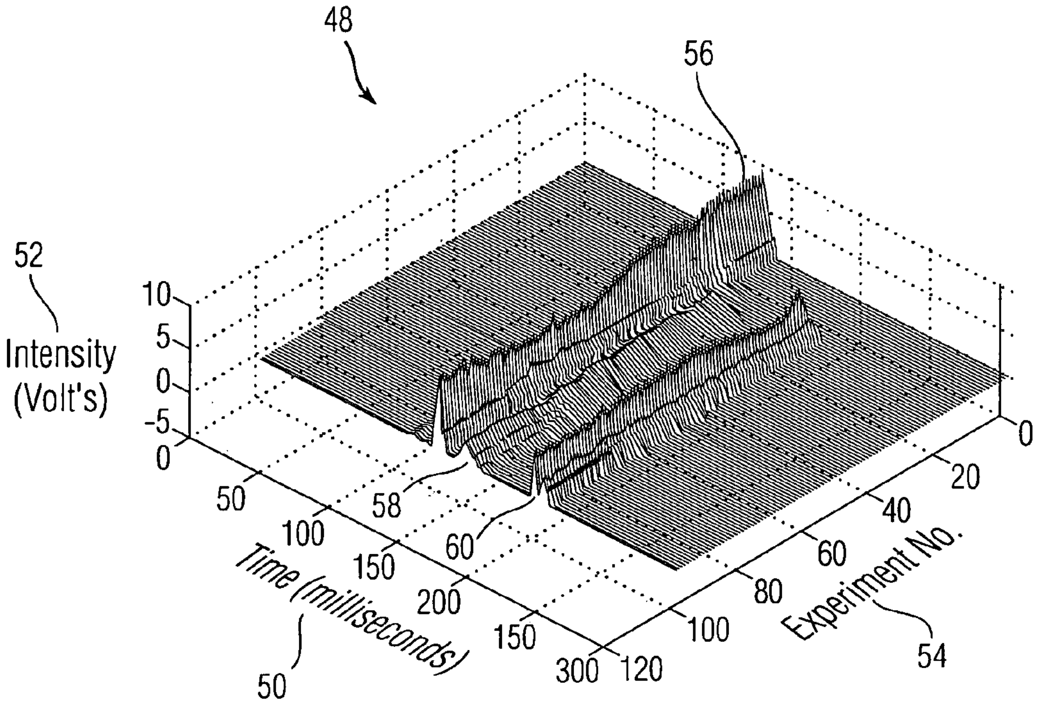
FIG. 4 is an example of an ion mobility spectrum.

Once the sample ions reach the second end of the drift tube, they contact the ion detector 30 inducing a current in the detector that is proportional to the number of sample ions striking it at any given time. The method of the present invention monitors the induced current in the detector 30 over time and generates a time dependent mobility spectrum that is associated with the sample. FIG. 4 illustrates a typical mobility spectrum 48 for one hundred tests, i.e. one hundred separate scan times, for a sample of dipropyleneglycol monomethylether (DPM). The time 50 for the sample ions to traverse the drift tube 26 and strike the ion detector 30 is given in milliseconds and plotted against the intensity of the current induced in the detector 52 given in volts. The resultant mobility spectra are listed by experiment or scan number 54. Acetone was used as the reactant, and the scans were initially run with only acetone, producing a single acetone peak 56 in the mobility spectrum 48. On subsequent scans containing the DPM, two peaks 58,60 associated with the DPM in addition to the acetone peak 56 were generated.

Figure 5:
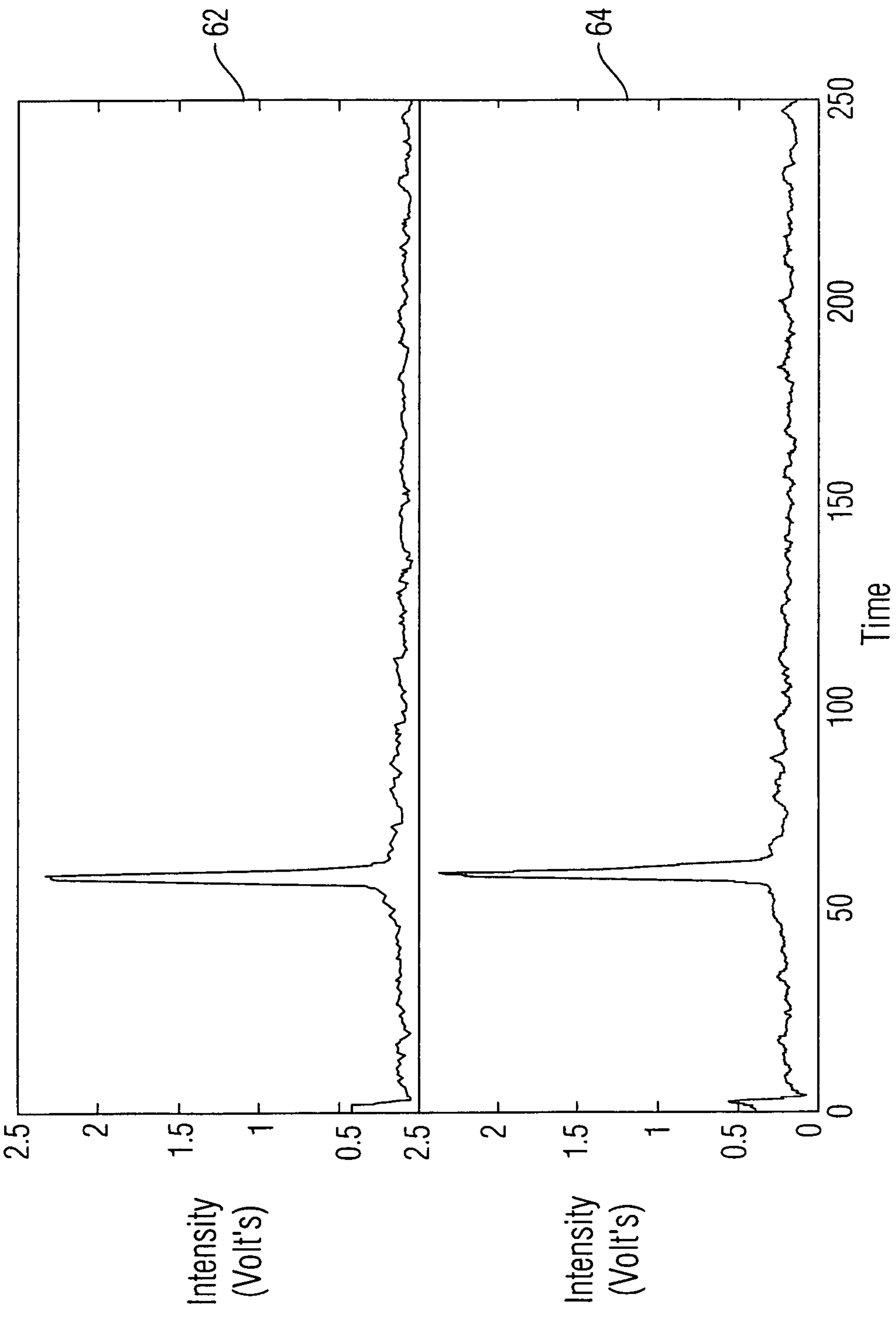
FIG. 5 is a comparison of ion mobility spectra for acetone and acetone plus isopropanol.

The method in accordance with the present invention increases the sample ions used for analysis from less than one percent to fifty percent or more. Thus, the sensitivity of the IMS device is greatly increased since more ions are available at any given instance in time. However, the mobility spectrum produced is not as easily analyzed via standard methods. In addition, when conducting scans in the field, the level of the agent being detected can be rather low, may be present as a mixture of two or more agents or may be present with one or more interferents. As illustrated in FIG. 5, for example, a mobility spectrum for acetone alone 62 appears substantially identical to a mobility spectrum for acetone and isopropanol 64.

Therefore, the method in accordance with the present invention also includes using the mobility spectrum to generate a distinct signature for the unknown sample and comparing that distinct signature to at least one known agent signature to determine if the distinct sample signature matches the known agent signature. In one embodiment, the mobility spectrum of the unknown sample is processed using wavelet decomposition to produce the distinct signature associated with the sample. The decomposed mobility spectrum is further processed by evaluating the decomposed mobility spectrum using one or more statistical evaluators. In one embodiment, five statistical evaluators are used. Suitable statistical evaluators include average, standard deviation, maximum, minimum, and covariance. The mobility spectrum and signature for the known agent can be created by the same steps used to create the unique signature for the unknown sample.

Figure 6:
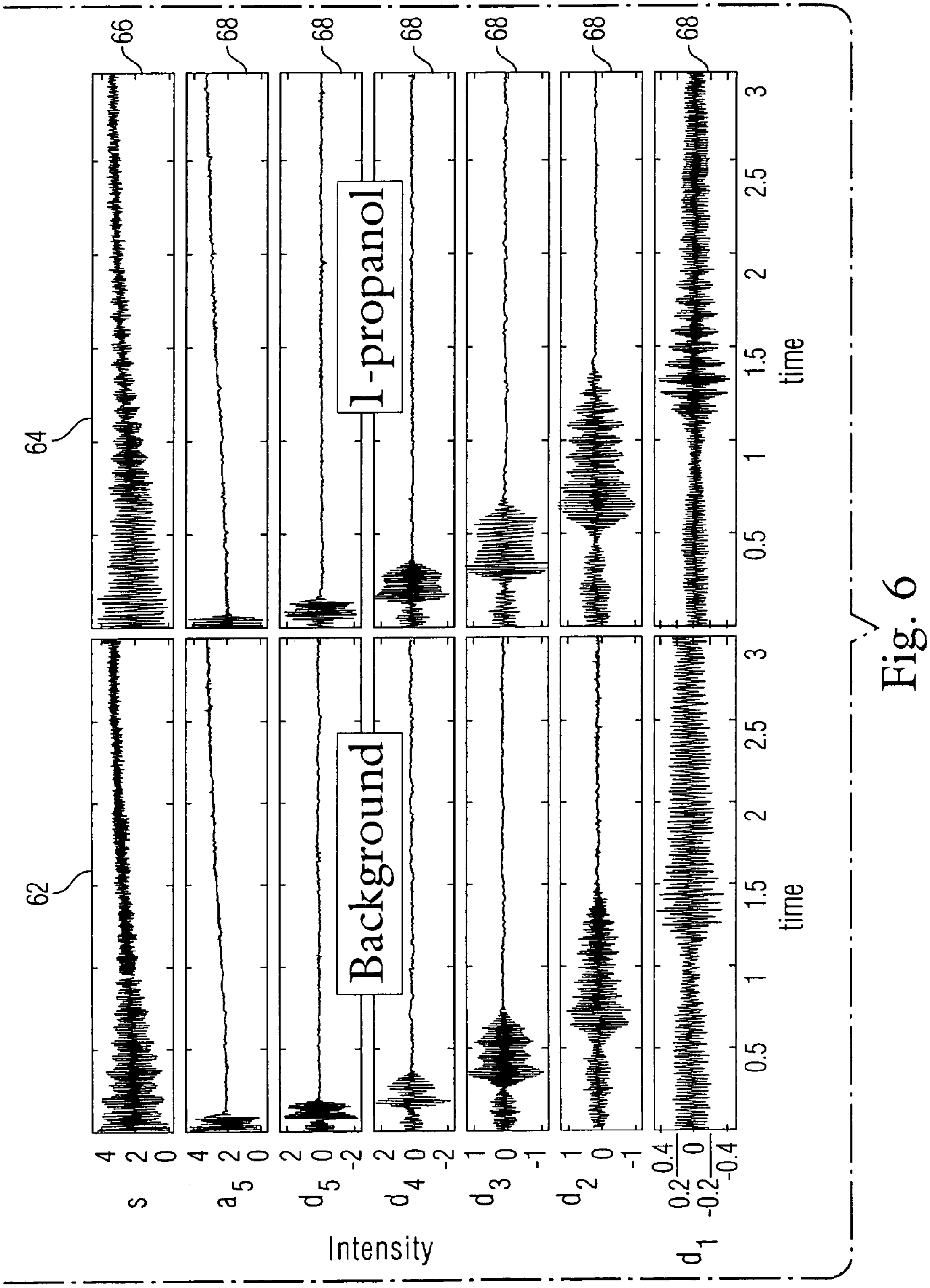
FIG. 6 is a comparison plot of the ion mobility spectra for acetone and acetone plus isopropanol following wavelet decomposition in accordance with the present invention.

By using wavelet decomposition and statistical evaluators, the differences between agents become very distinct. Thus, the selectivity of the IMS system is increased. FIG. 6 illustrates the resulting time vs. intensity plots for the acetone 62 and acetone plus isopropanol 64 mobility spectra of FIG. 5. As shown, the initial signal 66 is broken down into the component signals 68, resulting in signatures for acetone 62 and acetone plus isopropanol 64 that are clearly and easily distinguishable. The decision maker can then be used to compare the unique signature associated with the sample to the known agent signature to determine if the distinct sample signature matches the known agent signature.

In order to facilitate the comparison and identification of unknown samples against a known agent, the method in accordance with the present invention also includes creating a signature for a known agent and training a neural network, for example a neural network within the logic control unit as discussed above, using the known agent signature. In another embodiment, a plurality of signatures for a plurality of known agents are created, and the neural network is trained using each one of the plurality of known agent signatures.

The neural network is well suited for use with a plurality of known agent signatures, because the neural network uses an adaptive learning rule that assigns an adaptive weight to each one of a plurality of inputs. The adaptive weight for each given input is modified as more data, that is more known agent signatures, are trained into the neural network. A given binary output is a function of the inputs and their associated weights. Therefore, when the signature of an unknown sample is evaluated, each one of the functions is evaluated, and the functions producing a positive binary output indicate an identification or match for the unknown sample. The binary outputs can be arranged to trigger an alarm when certain agents are detected at the desired levels. Since the ambient conditions of the test may vary, the decision maker is preferably a fuzzy decision maker.

The method in accordance with the present invention is suitable for use in identifying samples that contain single components or a mixture of compounds. In the case of a mixture, the decision maker compares the unique signature to the known agent signatures and identifies two or more known agent signatures matching the distinct sample signature.

The combination of a square wave ion gate signal with wavelet decomposition, statistical evaluators, and a decision maker can differentiate between background, analyte, interferent, and a binary mixture of analyte and interferent. This results in an overall increase in resolving power. The IMS system and method in accordance with the present invention are less sensitive to false positives due to increased selectivity, show the ability to yield quantitative data at ultra-low concentrations for low level toxicity and have the ability to detect binary mixtures of compounds.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for analyzing a sample using ion mobility spectrometry, the method comprising:

pulsing an ion gate located at one end of a drift tube during a pre-determined scan time using a temporally spaced pattern comprising a plurality of ion admitting periods and a plurality of ion repelling periods, each ion admitting period representing a distinct length of time corresponding to a distinct admission frequency;

generating a time dependent mobility spectrum associated with the sample based upon the voltage induced by a plurality of sample ions passing into the drift tube during the admitting periods and striking an ion detector disposed at a second end of the drift tube opposite the first end; and processing the mobility spectrum using wavelet decomposition to produce a distinct signature associated with the sample.

2. The method of claim 1, wherein the sum of all the distinct lengths of time equals about 50% of the pre-determined scan time.

3. The method of claim 1, further comprising decreasing the length of time associated with each admitting period as the corresponding admission frequency increases.

4. The method of claim 1, wherein the step of processing the mobility spectrum further comprises evaluating the decomposed mobility spectrum using at least one statistical evaluators.

5. The method of claim 4, wherein five statistical evaluators are used.

6. The method of claim 5, wherein the five statistical evaluators comprise average, standard deviation, maximum, minimum and covariance.

7. The method of claim 1, further comprising comparing the distinct signature associated with the sample to at least one known agent signature to determine if the distinct sample signature matches the known agent signature.

8. The method of claim 1, further comprising:

creating a signature for a known agent;

training a neural network using the known agent signature;

using a decision maker to compare the unique signature associate with the sample to the known agent signature to determine if the distinct sample signature matches the known agent signature.

9. The method of claim 1, further comprising:

creating a plurality of signatures for a plurality of known agents;

training a neural network using the known agent signatures;

using a decision maker to compare the unique signature associated with the sample to the known agent signatures to determine which known agent signature matches the distinct sample signatures.

10. The method of claim 9, wherein the decision maker is a fuzzy decision maker.

11. The method of claim 9, wherein the sample comprises at least a binary mixture and the step of using the decision maker to compare the unique signature further comprises identifying at least two known agent signatures matching the distinct sample signature.

12. An ion mobility spectrometry system comprising:

a drift tube comprising an accelerating voltage potential and a counter-current draft gas;

an ion gate disposed at a first end of the drift tube;

an ion gate controller in communication with the ion gate and arranged to pulse the ion gate during a predetermined scan time using a temporally spaced pattern comprising a plurality of ion admitting periods and a plurality of ion repelling periods, each ion admitting period representing a distinct length of time corresponding to a distinct admission frequency;

an ion detector disposed adjacent a second end of the drift tube opposite the first end, the detector generating a time dependent mobility spectrum based upon the voltage induced by a plurality of sample ions passing into the drift tube during the admitting periods and striking the ion detector; and a logic processor in communication with the ion detector to receive the mobility spectrum, the logic processor capable of processing the mobility spectrum using a combination of wavelet decomposition and statistical evaluators to produce a distinct signature associated with the sample.

13. The system of claim 12, wherein the logic processor further comprises a neural networked and a fuzzy decision maker, wherein the neural network has been trained using a plurality of signatures associated with a plurality of known agents.

14. The system of claim 12, wherein the ion gate controller comprises a transistor-transistor logic level clock source.

* * * * *